United States Patent [19]

Sanders

[11] 3,990,466
[45] Nov. 9, 1976

[54] STOP AND WASTE VALVE CONSTRUCTION

[76] Inventor: Ed B. Sanders, 404 St. Louis Ave., Hot Springs, Ark. 71901

[22] Filed: Aug. 28, 1974

[21] Appl. No.: 501,468

[52] U.S. Cl. ............................. 137/123; 137/625.27
[51] Int. Cl.² ..................... F04F 10/00; F16K 11/04
[58] Field of Search ............... 137/625.27, 123, 153, 137/625.26, 625.25, 151; 251/357

[56] References Cited
UNITED STATES PATENTS

| | | | |
|---|---|---|---|
| 75,376 | 3/1868 | Cooper | 137/625.27 |
| 109,371 | 11/1870 | Bailey | 137/625.27 UX |
| 250,897 | 12/1881 | Descours | 137/151 X |
| 672,078 | 4/1901 | Harrington | 137/625.27 |
| 898,383 | 9/1908 | Mortimer | 137/625.27 |
| 1,301,549 | 4/1919 | Fosler | 137/625.27 |
| 2,123,814 | 7/1938 | Summers | 137/625.27 X |
| 3,019,806 | 2/1962 | Pirok et al. | 137/153 X |

FOREIGN PATENTS OR APPLICATIONS

| | | | |
|---|---|---|---|
| 359,351 | 1/1906 | France | 137/625.27 |

*Primary Examiner*—Martin P. Schwadron
*Attorney, Agent, or Firm*—Kramer and Brufsky

[57] ABSTRACT

A stop and waste valve construction disposed in a globe or gate valve housing, through which a water or other liquid supply travels. A tubular stem is threadedly connected to the housing adjacent its water chamber. Threadedly connected within the tubular stem is a shaft having a stop valve at one end which can be seated on a valve seat within the water chamber in the valve housing to provide a positive water shut-off by precluding communication between the inlet to and the outlet from the valve housing. A siphon tube is integrally connected to the wall of the tubular stem for draining the water chamber in the valve housing of waste through the tubular stem when the stop valve is seated on the valve seat in the water chamber. This insures that no foreign waste material can enter into the water supply system.

3 Claims, 3 Drawing Figures

STOP AND WASTE VALVE CONSTRUCTION

BACKGROUND OF THE INVENTION

1. Field of the Invention

This invention relates to a valve construction, and more particularly, a valve construction adapted to stop the flow of water or other fluid in a pipe but which permits a free and ready waste of the water or fluid which has passed through the valve after the same has been closed, to insure that no foreign waste material can enter into the water or fluid supply system.

2. State of the Prior Art

The stop and waste valve construction of the present invention is designed to replace the usual water cut-off valve used in all dwellings and other places where a city water supply is provided. Such water cut-off valves are disposed in a globe valve or gate valve housing which when closed precludes water from flowing into the water supply system in the dwelling, for example, when an emergency arises.

The valve construction of the present invention can be used with a standard globe valve or gate valve housing. The valve construction will provide a positive water shut-off but in addition, has the added advantage of insuring that no foreign waste material can possibly enter into the water supply system after the stop valve has been closed. This objective is attained by providing a cleansing system in addition to the ordinary stop-valve, and to arrange the cleansing system to be operative at substantially the same time as when the stop valve is seated and conversely, the cleansing system to be substantially closed at the same time that the stop valve is opened to permit water or fluid to freely flow through the globe valve housing.

Stop and waste valves have been known in the prior art. Particularly, the patent to Charmois, U.S. Pat. No. 909,989, illustrates a dual valve construction for operation within a globe valve housing wherein a waste valve is automatically opened at substantially the same time the stop valve is seated to waste any water or fluid which has passed through the valve. Other dual valve systems are illustrated in U.S. Pat. No. 608,179 to Coffey and U.S. Pat. No. 1,099,418 to Aughenbaugh. All of these patents, however, rely upon a dual valve construction for wasting the fluid or water after a stop valve is closed.

SUMMARY OF THE INVENTION

As distinguished from the prior art, the stop and waste valve construction of the instant invention does not utilize a dual valve construction, but relies upon a siphon to remove the waste liquid when the stop valve is seated or closed.

The stop and waste valve construction of the present invention consists of two main units, which, when assembled, screw onto the standard globe or gate valve housing. The construction consists of a tubular stem threadedly connected to the globe valve housing. A shaft is provided which is threadedly connected within the interior of the tubular stem and rotatable therein. A stop valve at one end of the shaft is adapted to be seated on the valve seat in the globe valve housing to prevent communication between a fluid inlet and fluid outlet in the globe valve housing to provide a positive water shut-off. A handle or key on the other end of the shaft is provided for rotating the shaft to operatively move the stop valve towards and away from the valve seat.

A siphon tube is provided integral with the wall of the tubular stem and in communication with the interior of the tubular stem for draining the fluid chamber in the globe valve housing of waste through the tubular stem when the stop valve is seated on the valve seat.

Further objects and advantages of the instant invention will become apparent from the following specification, claims and from the accompanying drawings, wherein:

DETAILED DESCRIPTION OF THE PREFERRED EMBODIMENT

Figure 1:
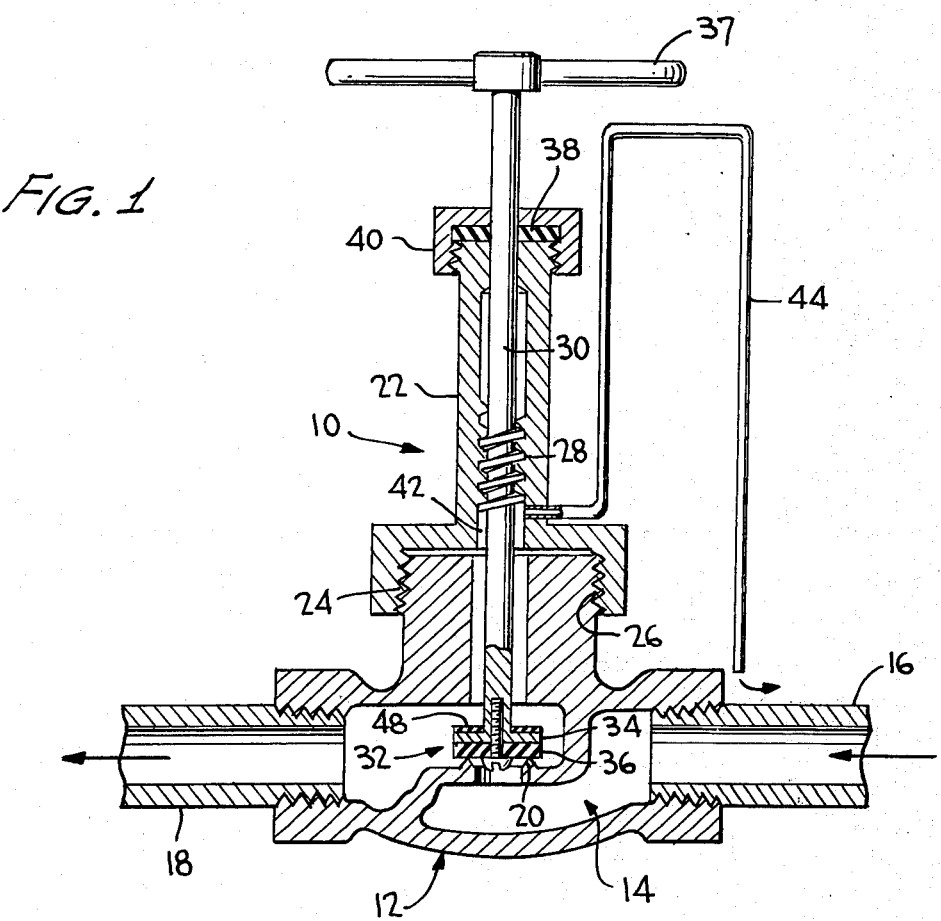
FIG. 1 is a longitudinal cross-section showing the stop and waste valve construction of the present invention applied to an ordinary globe valve housing.
Figure 2:
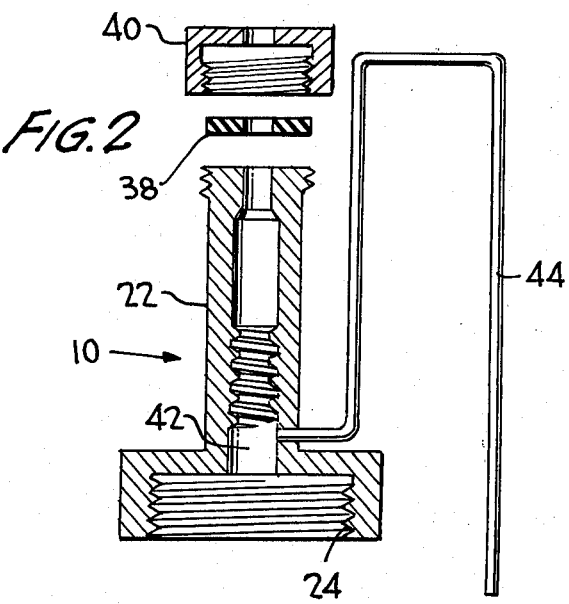
FIG. 2 is a longitudinal cross-section of the tubular stem and siphon tube portion of the stop and waste valve construction.
Figure 3:
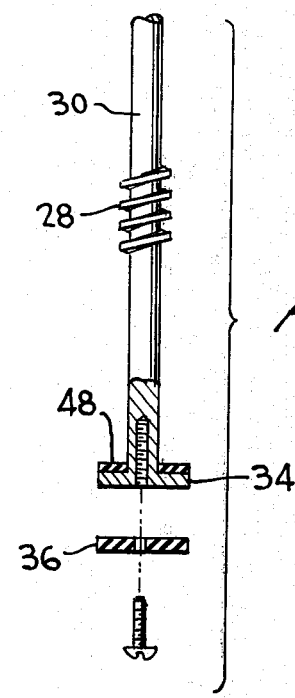
FIG. 3 is a longitudinal cross-section of the shaft rotatable within the tubular stem having a stop valve on one end thereof.

Referring now to the drawing in detail, wherein like numerals indicate like elements throughout the several views, the stop and waste valve construction of the present invention is illustrated in FIG. 1 by the numeral 10 and is shown as applied to a standard globe valve housing generally designated by the numeral 12. The globe valve housing 12 consists of a fluid chamber 14 connected at one end to an inlet pipe 16 and at the other end to an outlet pipe 18. A valve seat 20 extends across the fluid chamber 14 within the globe valve housing 12.

The stop and waste valve construction 10 includes a tubular stem 22 having a threaded portion 24 at one end which is threadedly connected to the globe housing threads 26. Rotatably mounted by oppositely threaded portion 28 within tubular stem 22 is a solid shaft 30. Shaft 30 terminates at one end in a stop valve 32 consisting of an annular head 34 and a sealing washer 36 threadedly connected to head 34. Alternatively, a gate valve can be interchanged for sealing washer 36 by threadedly connecting it to head 34. At its opposite end, shaft 30 has a handle or key 37 which can be grasped to rotate the shaft 30 and move stop valve 32 towards and away from valve seat 20.

Shaft 30 extends out of tubular stem 22 and is surrounded by a packing ring 38 and nut 40 to provide a fluid tight connection at this juncture. Below threaded portion 28 of shaft 30 there is sufficient clearance as shown at 42 between the wall of tubular stem 22 and shaft 30 so that water can be drawn into tubular stem 22 from fluid chamber 14 on its outlet side. A siphon tube 44 is integrally connected to the wall of tubular stem 22 below the threaded portion 28 of shaft 30 so as to be in communication with the interior of the tubular stem 22 and the outlet side of fluid chamber 14 when stop valve 32 is seated on valve seat 20.

In operation, the stop and waste valve construction will provide a positive water shut-off with the added advantage of insuring that no foreign waste material can possibly enter into the water supply system. When stop valve 32 is opened by rotation of handle 37 and shaft 30, water will pass freely through fluid chamber 14 of the globe valve housing 12 and into the clearance portion 42 of tubular stem 22. As the stop valve 32 is completely opened, a neoprene sealing washer 48 disposed on shaft 30 above head 34 of valve 32 will seal tubular stem 22 from fluid chamber 14 and preclude any siphoning of water through tube 44. Water can then freely flow through the system.

As valve 32 is turned back towards its closed position or seated position on valve seat 20, water under pressure is allowed to enter tubular stem 22. Water is forced through tubular stem and out the siphon tube 44 cleansing the system. Once valve 32 is completely closed and seated on valve seat 20, no further water escapes through the tubular stem 22, but opening of any valve or faucet on the outlet side of globe valve housing 12 will allow the siphon tube to drain off the water within the outlet side of globe valve housing 12 within the system, as well as the siphon tube itself.

Should dirt or foreign matter enter into the siphon tube 44 while the valve is in its closed position, such foreign matter will be forced out as valve 32 is opened. As valve 32 is opened, water flows from the inlet side of fluid chamber 14 up through tubular stem 22 under pressure and into the siphon tube 44 blowing out any foreign matter in the siphon tube.

What is claimed is:

1. A stop and waste valve adapted to be connected in a horizontal fluid supply line comprising
    a casing including a fluid chamber having a fluid inlet and fluid outlet,
    a valve seat in said fluid chamber between said fluid inlet and fluid outlet,
    a tubular stem threadedly connected to said casing in communication with said fluid chamber,
    a shaft rotatable within said tubular stem and threadedly connected thereto,
    a stop valve on one end of said shaft adapted to be moved towards and away from said valve seat in said fluid chamber to prevent communication between said fluid inlet and fluid outlet,
    handle means on the other end of said shaft for rotating said shaft to operatively move said stop valve towards and away from said valve seat, and
    siphon means in communication with the interior of said tubular stem for draining said fluid chamber of waste through said tubular stem when said stop valve is moved towards and away from said valve seat, said siphon means being an inverted, generally U-shaped tube having a first leg communicating with said tubular stem, a second and longer leg communicating with the external environment of the valve, and a bight portion connecting said first and second legs, said bight having a horizontal segment elevated from the upper end of said tubular stem.

2. A stop and waste valve construction in accordance with claim 1 wherein said stop valve includes
    an annular head on said one end of said shaft extending perpendicular to the longitudinal axis of said shaft and
    a seating washer attached to the bottom of said annular head.

3. A stop and waste valve construction in accordance with claim 2 including
    a sealing washer on said shaft above said annular head for sealing communication between the interior of said tubular stem and fluid chamber when said stop valve is opened to provide communication between said fluid inlet and fluid outlet in said casing.

* * * * *